United States Patent [19]

Dunahoo

[11] 4,255,836

[45] Mar. 17, 1981

[54] CONTINUOUS FILAMENT APEX FITTINGS AND METHODS OF MANUFACTURE THEREOF

[75] Inventor: Edmond A. Dunahoo, Long Beach, Calif.

[73] Assignee: Fiber Science, Inc., Salt Lake City, Utah

[21] Appl. No.: 953,863

[22] Filed: Oct. 23, 1978

[51] Int. Cl.³ ............................................. F16G 11/00
[52] U.S. Cl. ............................... 24/122.6; 24/265 EE; 403/159
[58] Field of Search .......... 294/74; 24/265 EE, 122.6; 59/93, 26, 35, 21; 403/302, 157, 159

[56] References Cited

U.S. PATENT DOCUMENTS

| | | | |
|---|---|---|---|
| 3,722,942 | 3/1973 | Baur | 294/74 |
| 4,119,344 | 10/1978 | Kondo | 24/265 EE X |

FOREIGN PATENT DOCUMENTS 1241849  8/1971  United Kingdom ...................... 294/74

Primary Examiner—Kenneth Downey
Attorney, Agent, or Firm—Blakely, Sokoloff, Taylor & Zafman

[57] ABSTRACT

Continuous filament apex fittings and methods of manufacture thereof to provide high-strength, low-weight fittings for use on cargo lifts and the like, and as replacements for metal clevises. The fittings are made by wet-winding one or more strands of continuous filaments into a loop, forming the loop into a basic clevis-like shape and curing the resin. The use of a flexible resin allows spreading of the clevis eyes for entry and removal of the item to be retained by the clevis without a separate clevis pin. Twisting of the loop one or more times along the major length of the loop prior to bending in the basic clevis shape creates an integrated clevis body having better load distribution across the cross-section thereof. Alternate methods of manufacture are disclosed.

7 Claims, 10 Drawing Figures

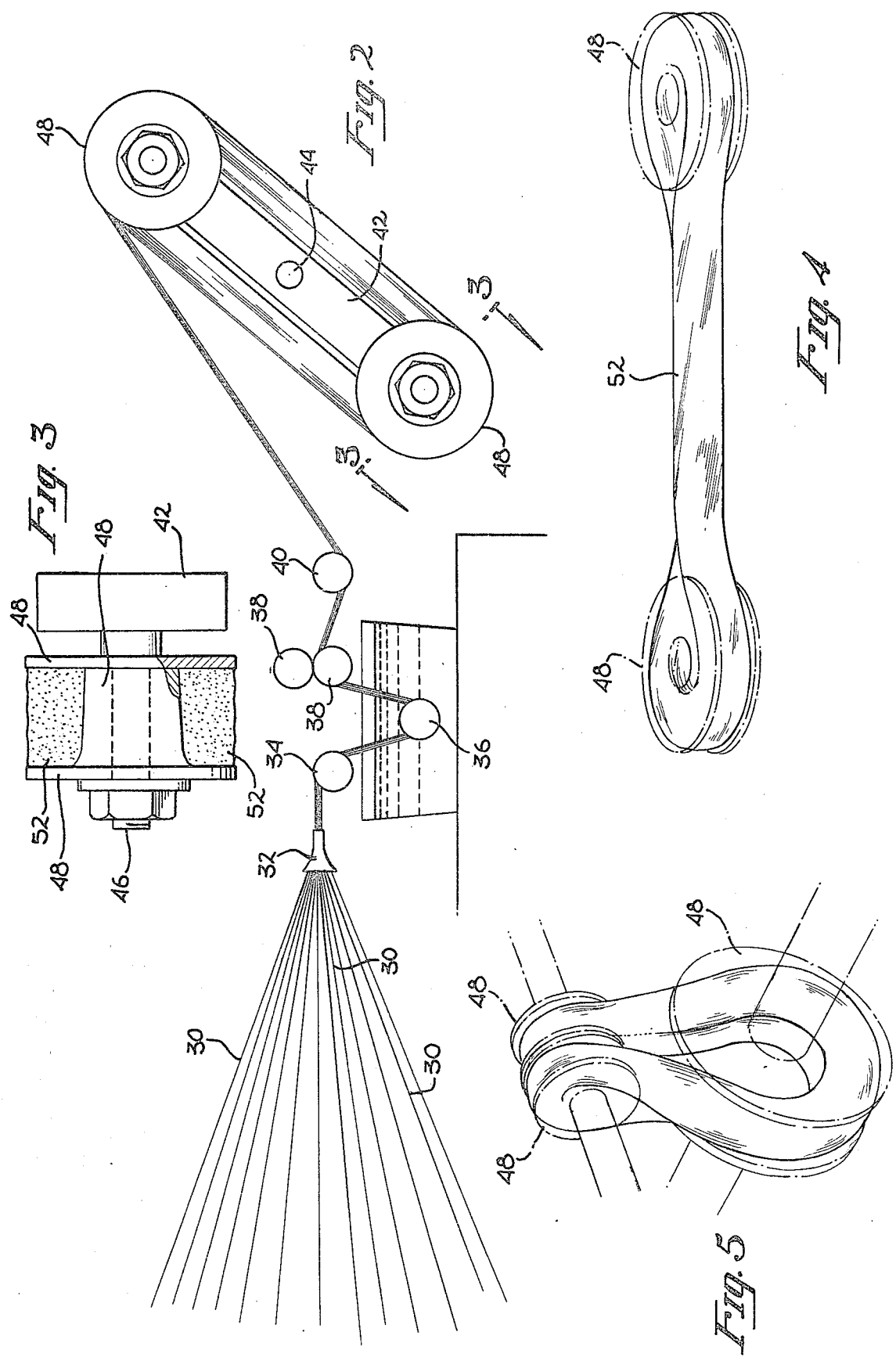

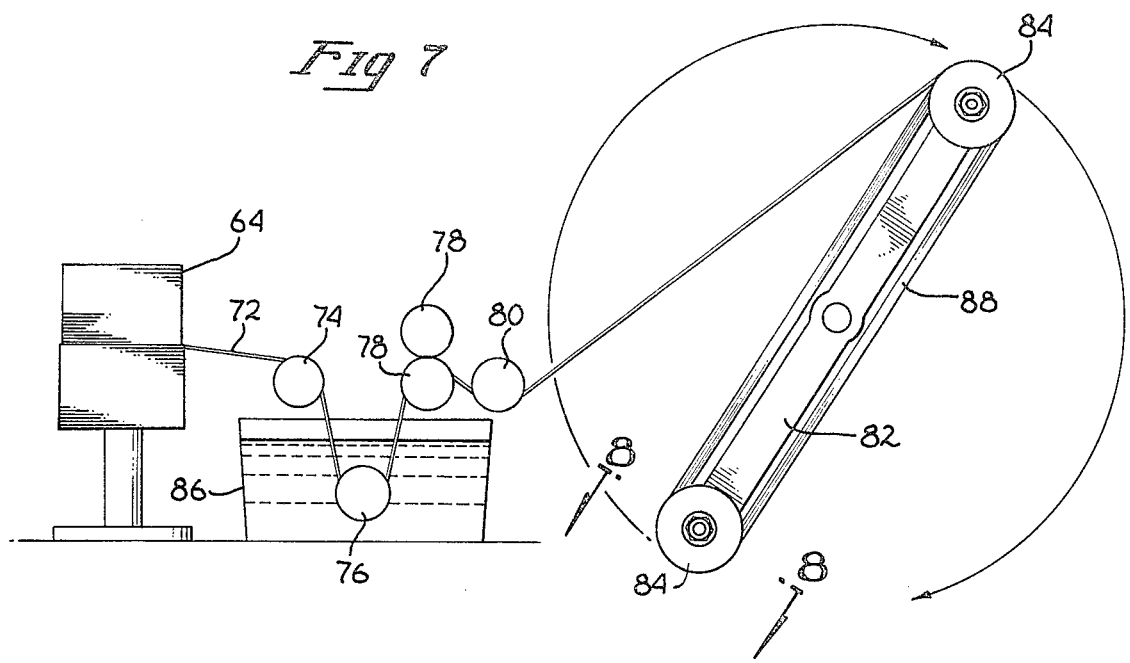
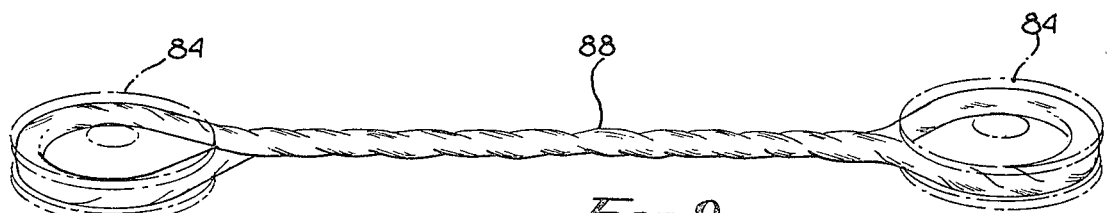
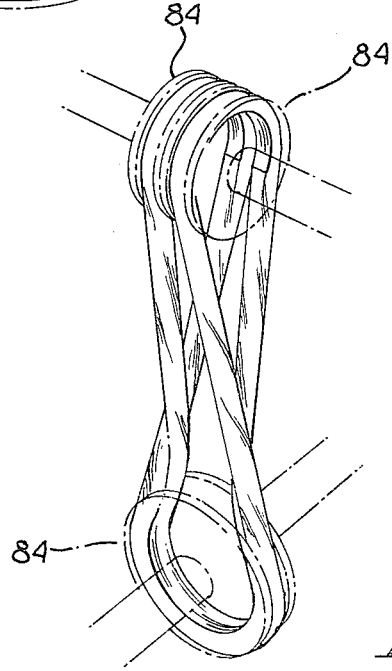
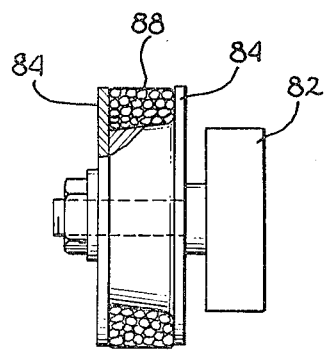

CONTINUOUS FILAMENT APEX FITTINGS AND METHODS OF MANUFACTURE THEREOF

BACKGROUND OF THE INVENTION

1. Field of the Invention

The present invention relates to the field of apex fittings clevises and the like.

2. Prior Art

Metal clevises of various designs and structures are well-known in the prior art. Such devices are generally characterized by an approximately U-shaped main body with an eye in the end of each leg of the U, the eyes being generally axially aligned to receive a pin therethrough. Frequently, one of the eyes and one end of the pin are both threaded so that the pin may be threaded into place and locked into position with respect to the clevis. Such devices are widely used, finding broad application from very small sizes to very large sizes.

In many applications, metal clevises are ideal as being relatively inexpensive, sufficiently strong and easy to use. In certain applications, however, metal clevises and clevis-like structures, because of the loads involved, are heavy and inconvenient to use. Shear weight alone may make the clevises difficult to manipulate, aggravated by the fact that the clevis and clevis-pin must be separately manipulated. Further, the weight itself creates a safety hazard, as a reasonable impact between, say, a forty-pound clevis and an equal or larger crane hook can have a bone-crushing effect on a finger inadvertently located therebetween.

One typical application for clevis-like structures is apex fittings. Such fittings, which frequently are metal clevis-like structures, receive the lifting straps on cargo nets and are intended for hooking over a crane hook to provide the central lifting point. Such devices are used on ordinary cranes, shipboard cranes and even helicopter cranes wherein the loads being lifted at any one time may run many tens of thousands of pounds. Frequently the load to be lifted prevents or inhibits convenient disposal of the apex fitting so that the user winds up reaching out at arm's length to lift the clevis and manipulate the clevis pin. Accordingly, lighter and/or more convenient devices are highly desirable and have been the subject of substantial effort by others.

In U.S. Pat. No. 3,079,192, a cargo sling is disclosed which is formed or wire rope or the like. The sling is characterized by a rope-like assembly having a loop at each end protected by a sheath. The sling is fabricated by spacing the sheaths as desired and then hooking one end of the rope over one sheath, winding it down around the second sheath, up over the start end of the rope on the first sheath and down again, with the finished end of the rope being tucked between the loop formed by the winding and the second sheath. With this construction, the load on the main loops increases the frictional engagement of the rope ends to help avoid slippage thereof. The resulting rope-like assembly is therefore comprised of three lengths of the rope or cable. In U.S. Pat. No. 2,199,958, a hoisting sling of generally similar construction is shown with one embodiment being formed of a single length of cable so that the body consists of three cables and the eyes consist of two cables, and the second embodiment being formed of two cables to provide a body formed of four cables and eyes consisting of three cables. U.S. Pat. No. 3,222,858 discloses a twisted cable assembly and method of making the assembly which utilizes a single strand of wire looped over a pair of spaced apart pins a substantial number of times, and then twisted about its length to form a central section of twisted wire cable with continuous loops of wire at each end thereof. In an alternate method of making the twisted cable assembly the wire is pre-twisted along its axis so that after winding around the spaced-apart pins the untwisting of the individual wires will form the twist of the desired finished cable.

In addition to the foregoing patents, U.S. Pat. No. 3,631,733 discloses an elastic transmission belt of single loop twisted construction, with the looped ends thereof being held together by a metal clip. Also, U.S. Pat. No. 4,045,072 discloses an abrasion-resistant boot and pendant or sling of wrapped construction.

BRIEF SUMMARY OF THE INVENTION

Continuous filament apex fittings and methods of manufacture thereof to provide high-strength, low-weight fittings for use on cargo lifts and the like and as replacements for metal clevises. The fittings are made by wet-winding one or more strands of continuous filaments into a loop, forming the loop into a basic clevis-like shape and curing the resin. The use of a flexible resin allows spreading of the clevis eyes for entry and removal of the item to be retained by the clevis without a separate clevis pin. Twisting of the loop one or more times along the major length of the loop prior to bending in the basic clevis shape creates an integrated clevis body having better load distribution across the cross-section thereof. Alternate methods of manufacture are disclosed.

BRIEF DESCRIPTION OF THE DRAWINGS

FIGS. 2 through 5 are schematic illustrations of the steps and apparatus for making the apex fitting of FIG. 1.

FIGS. 6 through 10 are schematic illustrations of the method and equipment used to make an alternate form of fitting.

DETAILED DESCRIPTION OF THE INVENTION

Figure 1:
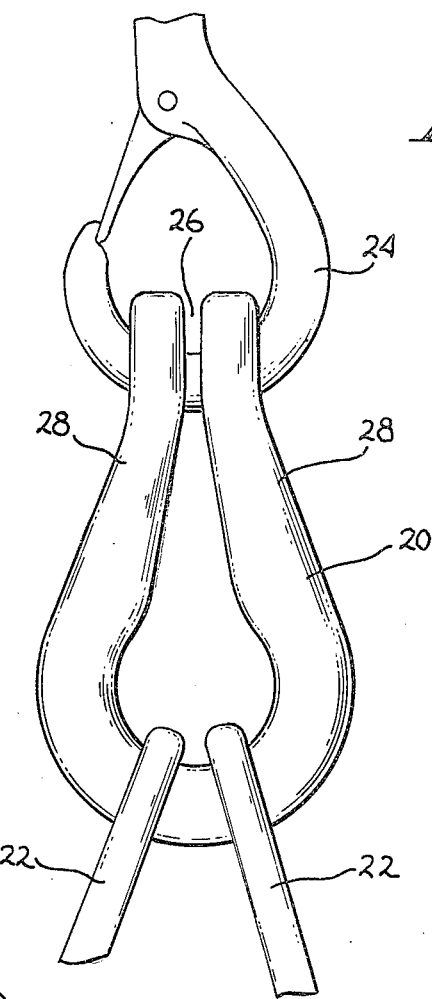
FIG. 1 is a view showing one embodiment of the present invention and an illustrative use thereof.

First referring to FIG. 1, one embodiment of apex fittings in accordance with the present invention may be seen. The fitting 20 is illustrated in conjunction with a typical application, specifically to retain lines 22 coupled to a cargo net or other load to be lifted, and to couple the lines to a hook 24 of a crane or lift such as, by way of example, found on cargo helicopters. As will be seen in the subsequent description, the fitting 20 may be made flexible, having a substantial elastic characteristic so that the free state gap 26 between the legs 28 of the fitting may be less than the size of the straps or cables 22 to be disposed therein. In this manner, the operator may spread the legs 28 of the fitting for insertion of the straps 22, with the legs 28 of the fitting returning to the initial position to retain the straps therein. Thus, it may be seen that the typical clevis pin generally used with respect to metal clevises is not required, thereby eliminating the need for a second part which is subject to being lost, and eliminating the need for a lock therebetween or for an operator to manipulate two parts under adverse conditions.

The method of manufacture of the apex fittings 20 shown in FIG. 1 is illustrated in FIGS. 2 through 5. The preferred embodiments of the present invention are made of Kevlar filaments manufactured by Dupont.

Kevlar is commercially available in untwisted multifilament strands, which form is preferably used with the methods herein described. Thus, in FIG. 2 a plurality of strands 30, each supplied from a ball of such strands (not shown), are drawn through an eyelet 32 and guided around guides or rollers 34, 36, 38 and 40 for winding on a yoke assembly generally indicated by the numeral 42. The yoke assembly is supported for rotation about an axis 44, having located at each end thereof a pin or stud 46 (see also FIG. 3) for attachment of split shaping members 48.

Guide 36 is located within a resevoir 50 and below the surface of an uncured flexible urethane resin so that the combined strands are impregnated with the resin for wet-winding onto the yoke 42. In this regard, it is perhaps best to drive rollers 38 at a uniform speed to maintain uniformity in the wet-winding process, with the yoke 42 being driven in rotation through a slip-clutch to take up the impregnated strands as they become available. In the preferred embodiment, the flexible urethane resin used is Hughson 2257-14A&B manufactured by Hughson Chemicals, a Division of Lord Corporation of Erie, PA. 16512.

Once the winding is complete, the strands being fed onto the winding are cut and the free end laid in place, buried or tied to the body of the winding. The winding 52 is then removed from the yoke and twisted about its axis 180° or multiples thereof, as shown in FIG. 4. While FIG. 4 illustrates the winding twisted with shaping members 48 remaining in place, the shaping members may in fact be removed or replaced for this step. Also, while a single 180° turn is adequate to cause the center of the loop to close by laying one side over the other side, multiple half turns may be more appropriate for fittings of longer proportions.

After twisting along the length as shown in FIG. 4, the winding is then folded in the middle, preferably around a suitable shaping mandrel 54 so as to form the winding into the basic fitting shape. For this purpose it is preferable to use a shaping mandrel both for the eyes and for the basis U-shape, the eyes being perhaps best formed by using the shaping members 48 throughout the steps of FIGS. 2, 4 and 5. In that regard, the shaping members 48 may be coupled together by some suitable secondary coupling means other than through pin 46 so that they will remain assembled until after the curing of the resin following the shaping step of FIG. 5. The use of such shaping members will also assure that the two eyes are cured with the desired gap therebetween for the desired use of the device.

Having now described the basic method of making one embodiment of the fitting of the present invention, certain specific details with respect thereto will now be given. The preferred embodiments, as mentioned before, are made from Kevlar, which is readily commercially available in multifilament untwisted strands of various sizes. While twisted strands could be used, the untwisted strands are generally preferred. The number of such strands which are combined in the step of FIG. 2 will depend upon the size of the strands used and upon the size of the fitting desired, and may range from one to 10 or more. In particular, the strand or combined strands should be such that the desired winding may be made with a substantial number of strands, though if that number is too high excessive winding time may be required. It is particularly desired that the number of turns in the winding be sufficiently high so that the turn having the start end and the turn having the finish end together represent a small percentage of the total number of windings, as these turns are generally weaker because of the imperfect anchoring of the free ends. A number of turns on the order of 100 has been found suitable, with the number of turns of less than 10 having the disadvantage of giving prominence to the start and finish ends, and a number of turns exceeding 1,000 would probably require an excessive winding time without associated benefit. Also, if desired, the regions of the fitting which will be subjected to wear may be provided with a build-up of suitable wear-resistant material such as, by way of example, a firm polyurethane which may be applied by painting or the like after curing the fitting in step 5, or may, as a preform, be put in place prior to the curing of the step of FIG. 5 so that the preform becomes bonded to the fitting. In that regard, care must be taken in selecting the wear-resistant material, as the fittings in accordance with the present invention, when fabricated of the high strength synthetic filaments, will support exceptional loads resulting in substantial pressures on the wear resistant material. Accordingly, care should be taken to select the material which will remain in place rather than breaking or being extruded outward because of the pressures involved.

Now referring to FIGS. 6 through 10, an alternate form of fitting and method of making the same may be seen. In accordance with this method a plurality of strands 30 supplied by rolls of strands 60 are combined through an eyelet 62 and rolled up in a ball 64 on a reel driven upon its axis by a suitable drive means 66. Simultaneously, the yoke 68 on which the reel is positioned is rotated about an orthogonal axis by a second drive means 70 so that the strands combined by the eyelet 62 are twisted through an angle per unit length determined by the ratio of speeds of the two drive means. The net result is that the cord or twine being wound onto the ball 64 has a substantial twist therein and exhibits a relatively strong tendency to untwist unless the free end thereof is restrained.

The next step is to wet-wind the twine 72 into a loop in a manner similar to that described with respect to FIG. 2. Specifically, the ball of twine 64 is used to supply the twine 72 through a system of rollers or guides 74, 76, 78, and 80 for winding on a yoke assembly 82, again using shaping members 84 at the ends of the yoke assembly. This aspect of the winding is substantially identical to that described with respect to FIG. 2 with the twine 72 being impregnated with the uncured resin in the reservoir 86 to form a wet-winding 88 on the yoke assembly. (A cross-section taken through one of the shaping members 84 is shown in FIG. 8). Note that this particular embodiment, in comparison to that described with respect to FIGS. 1 through 5, is of somewhat longer and slimmer design, although the method now being described is applicable to apex fittings of substantially any size and proportion.

After the winding 88 is complete, the winding and shaping members 84 are removed from the yoke 82 and the winding is twisted as shown in FIG. 9. In that regard, the twist put into the twine during the step of FIG. 6 creates a tendency of the loop or winding 88 to twist back on itself, as shown, so that the tendency to twist is inherent in the winding itself. Obviously, however, the amount of such twist should be in specific increments of 180° so that in general the twist occurring or put in in the step of FIG. 9 may vary somewhat from the twist which would occur. Thereafter, of course, as before, the fitting is completed by folding over a forming member 90, supporting members 84 as shown, and curing the flexible resin. This embodiment, as well as the previously disclosed embodiment, may be subjected to some load during the curing of the resin if desired, so that the filaments will tend to arrange themselves prior to curing so as to best distribute the load across the cross-section of the fitting.

Figure 6:
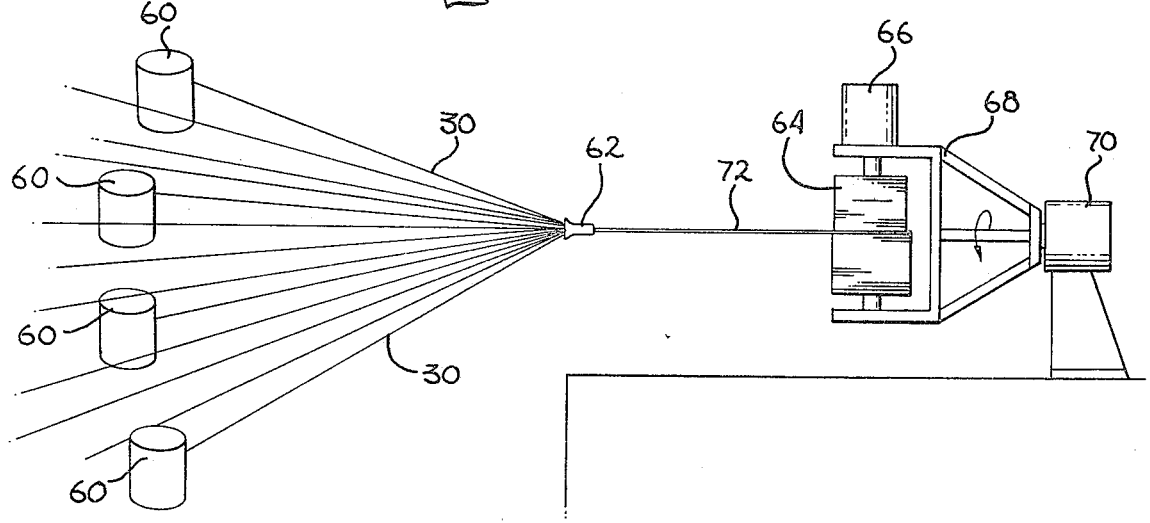

The advantage of the embodiment just described is that the twist in the twine injected through the step of FIG. 6 and the twist in the body of the fitting resulting from the step of FIG. 9 tends to better distribute loads during use across the cross-section of the fitting. In particular, the embodiment of FIG. 1 has filaments which are approximately straight and aligned with the various segments of the fitting so that filaments in some portions of the cross-section of the fitting may be subjected to stresses exceeding that of filaments in other parts of that cross-section, thereby giving some opportunity for progressive failure when subjected to high loads. The twist in the embodiment of FIG. 10, however, both in the twine itself and in the body of the fitting (FIG. 9), tends to better distribute and mix filament locations so as to minimize the opportunity for significantly unequal loading and the attendant progressive failure.

As in the embodiment of FIG. 1, the winding of this second embodiment is preferably formed of at least ten turns of twine and more preferably of approximately 100 turns, with the number of turns exceeding 1,000 probably being unnecessarily time-consuming to fabricate. While the twist imposed in the step of FIG. 6 may be varied dependent upon the desired characteristics of the fitting desired, a twist on the order of one to three turns per inch of twine is generally appropriate. Also, while a highly flexible urethane binder has been disclosed herein as being preferred because of its flexibility and chemical and abrasion resistance, other binders may also be used depending upon the proportions of the fitting to be made and the ultimate flexibility and other characteristics desired. By way of example, while the embodiments disclosed herein may be characterized as fittings having sufficient flexibility to allow spreading of the legs thereof for receipt of straps, etc. with the fitting returning to the original position to entrap the straps, obviously fittings which have a more rigid and open character, so as to generally always allow free passage of the straps therebetween, are also within the spirit and scope of the invention. Thus, though urethane binders are preferred, the exact characteristics of the urethane binder in terms of flexibility may be varied as desired, or even epoxy, latex or other binders used dependent upon the intended application and characteristics of the fitting. Perfect impregnation of the fittings by the binder is not required. Also, other filaments such as graphite filaments or even lower-strength filaments may be used, though the invention is particularly intended for non-metallic filaments of high strength and small diameter, as such filaments contribute to an exceptionally strong, light-weight and convenient to use fitting. Also, if desired, the windings do not need to be wet-wound but may be impregnated at a subsequent step such as, by way of example, with respect to the embodiment of FIG. 1 during the step of FIG. 4 or FIG. 5. Impregnation at that time may be partial only, protecting the outer surface of the fitting from chemical and mechanical wear and penetration, or may be total to result in substantially the same form of as provided by the hereinbefore described methods. Thus, while the preferred embodiments of the present invention and the methods of making such embodiments are disclosed and described in detail herein, it will be understood by those skilled in the art that various changes in form and detail may be made therein without departing from the spirit and scope of the invention.

I claim:

1. An apex fitting comprising an approximately U-shaped structure, the legs of the U-shaped structure each having a loop extending to the end thereof adjacent the loop on the other said leg, the U-shaped structure being comprised of a plurality of turns of continuous multifilament strands, the apex fitting being impregnated with a flexible binder to provide a self supporting structure having elasticity between said legs of said U-shaped structure.

2. The fitting of claim 1 wherein the binder is a flexible urethane resin.

3. The fitting of claim 1 wherein the binder is a flexible epoxy resin.

4. The fitting of claim 1 wherein the plurality of strands forming the base of the U-shaped structure are twisted through at least approximately 180°.

5. An apex fitting comprising an approximately U-shaped structure, the legs of the U-shaped structure each having a loop extending to the end thereof adjacent the loop on the other said leg, said U-shaped structure being comprised of a plurality of turns of continuous multifilament strands, each of said multifilament strands in the base of said U-shaped structure being twisted along its axis in a first direction, the plurality of strands in the base of said U-shaped structure being twisted in the direction opposite said first direction, said U-shaped structure being impregnated with a flexible binder to provide a self supporting structure.

6. The fitting of claim 5 wherein the binder is a flexible urethane resin.

7. The fitting of claim 5 wherein the binder is a flexible epoxy resin.

* * * * *